(12) United States Patent
Tang et al.

(10) Patent No.: US 7,570,036 B2
(45) Date of Patent: Aug. 4, 2009

(54) MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS

(75) Inventors: Benjamin Tang, Rancho Palos Verdes, CA (US); Robert T. Carroll, Andover, MA (US); Scott Wilson Southwell, Seal Beach, CA (US)

(73) Assignee: Primarion Corporation, Torrance, CA (US)

( * ) Notice: Subject to any disclaimer, the term of this patent is extended or adjusted under 35 U.S.C. 154(b) by 288 days.

(21) Appl. No.: 10/938,031

(22) Filed: Sep. 10, 2004

(65) Prior Publication Data

US 2006/0055388 A1 Mar. 16, 2006

(51) Int. Cl.
*G05F 1/575* (2006.01)
(52) U.S. Cl. .................. 323/283; 323/272; 323/284
(58) Field of Classification Search ............ 323/283, 323/272, 284, 285, 286, 282
See application file for complete search history.

(56) References Cited

U.S. PATENT DOCUMENTS

| | | | | |
|---|---|---|---|---|
| 5,635,934 A * | 6/1997 | Brown | ............... | 341/118 |
| 6,157,332 A * | 12/2000 | Frank et al. | ............... | 341/144 |
| 6,356,063 B1 * | 3/2002 | Brooks | ............... | 323/284 |
| 6,472,856 B2 * | 10/2002 | Groom et al. | ............... | 323/284 |
| 6,512,353 B2 * | 1/2003 | Sanzo et al. | ............... | 323/284 |
| 6,563,294 B2 * | 5/2003 | Duffy et al. | ............... | 323/283 |
| 6,667,606 B2 * | 12/2003 | Oglesbee et al. | ............... | 323/284 |
| 6,696,825 B2 * | 2/2004 | Harris et al. | ............... | 323/282 |
| 6,696,882 B1 * | 2/2004 | Markowski et al. | ............... | 327/531 |
| 6,856,121 B2 * | 2/2005 | Chou et al. | ............... | 323/222 |
| 7,007,176 B2 * | 2/2006 | Goodfellow et al. | ............... | 713/300 |
| 2002/0144163 A1 * | 10/2002 | Goodfellow et al. | ............... | 713/300 |
| 2002/0171985 A1 * | 11/2002 | Duffy et al. | ............... | 361/90 |
| 2003/0006650 A1 * | 1/2003 | Tang et al. | ............... | 307/43 |
| 2003/0102849 A1 * | 6/2003 | Schiff et al. | ............... | 323/222 |
| 2003/0141858 A1 * | 7/2003 | Caine et al. | ............... | 323/285 |
| 2006/0025892 A1 * | 2/2006 | Leung et al. | ............... | 700/293 |

* cited by examiner

*Primary Examiner*—Akm E Ullah
*Assistant Examiner*—Harry Behm
(74) *Attorney, Agent, or Firm*—The Noblitt Group, PLLC

(57) ABSTRACT

Disclosed is a multi-phase pulse width modulated voltage regulator and method in which transient voltage excursions or deviations that exceed the load line voltage by more than a pre-determined amount are detected by an ATR circuit and a correction signal is applied. The correction signal is in the form of asynchronous pulses and the number of such pulses is a function of the magnitude of the voltage excursion as determined by the number of thresholds that are exceeded. Also disclosed is an adaptive voltage positioning (AVP) circuit and method for early detection of a transient event by sensing voltage changes at the load and adjusting the target voltage with pre-determined current values prior to the time that ATR event changes in the current at the load are detected.

32 Claims, 12 Drawing Sheets

FIG. 8

|  | NUMBER OF PHASES | | | | |
| --- | --- | --- | --- | --- | --- |
|  | 2 | 3 | 4 | 5 | 6 |
| atrh1_phase1 | PHASE2 | PHASE3 | PHASE3 | PHASE3 | PHASE3 |
| atrh2_phase1 | 0 | PHASE2 | PHASE2 | PHASE5 | PHASE5 |
| atrh3_phase1 | 0 | 0 | PHASE4 | PHASE2 | PHASE2 |
| atrh1_phase2 | PHASE1 | PHASE1 | PHASE4 | PHASE4 | PHASE1 |
| atrh2_phase2 | 0 | PHASE3 | PHASE1 | PHASE1 | PHASE6 |
| atrh3_phase2 | 0 | 0 | PHASE3 | PHASE3 | PHASE3 |
| atrh1_phase3 | 0 | PHASE2 | PHASE2 | PHASE5 | PHASE2 |
| atrh2_phase3 | 0 | PHASE1 | PHASE4 | PHASE2 | PHASE4 |
| atrh3_phase3 | 0 | 0 | PHASE1 | PHASE4 | PHASE1 |
| atrh1_phase4 | 0 | 0 | PHASE1 | PHASE1 | PHASE6 |
| atrh2_phase4 | 0 | 0 | PHASE3 | PHASE3 | PHASE3 |
| atrh3_phase4 | 0 | 0 | PHASE2 | PHASE5 | PHASE5 |
| atrh1_phase5 | 0 | 0 | 0 | PHASE2 | PHASE4 |
| atrh2_phase5 | 0 | 0 | 0 | PHASE4 | PHASE1 |
| atrh3_phase5 | 0 | 0 | 0 | PHASE1 | PHASE6 |
| atrh1_phase6 | 0 | 0 | 0 | 0 | PHASE5 |
| atrh2_phase6 | 0 | 0 | 0 | 0 | PHASE2 |
| atrh3_phase6 | 0 | 0 | 0 | 0 | PHASE4 |

*FIG. 11*

MULTI-THRESHOLD MULTI-GAIN ACTIVE TRANSIENT RESPONSE CIRCUIT AND METHOD FOR DIGITAL MULTIPHASE PULSE WIDTH MODULATED REGULATORS

CROSS REFERENCES TO RELATED APPLICATIONS

This application includes subject matter that is related to and claims priority from the following patent applications, commonly assigned to the assignee of the present application, that are hereby incorporated herein by reference:

1. SYSTEM AND METHOD FOR HIGHLY PHASED POWER REGULATION, Ser. No. 10/112,738 filed Apr. 1, 2002, inventors: Duffy, et al, now U.S. Pat. No. 6,563,294.

2. SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy et al.

3. SYSTEM AND METHOD FOR CURRENT HANDLING IN A DIGITALLY CONTROLLED POWER CONVERTER, Ser. No. 10/237,903, filed Sep. 9, 2002, inventors: Duffy et al.

4. SYSTEM AND METHOD FOR HIGHLY PHASED POWER REGULATION, Ser. No. 09/975,195, filed Oct. 10, 2001, inventors: Duffy et al.

5. SYSTEM AND METHOD FOR HIGHLY PHASED POWER REGULATION USING ADAPTIVE COMPENSATION CONTROL, Ser. No. 09/978,294, filed Oct. 15, 2001, inventors: Goodfellow et al.

6. SYSTEM AND METHOD FOR HIGHLY PHASED POWER REGULATION USING ADAPTIVE COMPENSATION CONTROL, Ser. No. 10/109,801, filed Oct. 15, 2001, inventors: Goodfellow et al.

7. DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al

BACKGROUND OF THE INVENTION

1. Technical Field of Invention

The present invention relates, generally, to power regulation systems and, in particular, to providing precisely regulated power to a microelectronic device such as a microprocessor. Improved power regulation is accomplished with an Active Transient Response Circuit that detects multiple threshold levels and provides multiple levels of gain.

2. Background of the Invention

Regulated power supplies or voltage regulators are typically required to provide the voltage and current supply to microelectronic devices. The regulator is designed to deliver power from a primary source to an electrical load at the specified current, voltage, and power efficiency. Switching power converters (SPC) also referred to as Buck regulators are commonly used voltage regulators due to their high efficiency, high current capability, and topology flexibility. In addition, they can be designed to provide very precise voltage and current characteristics required by devices such as microprocessors, microcontrollers, memory devices, and the like.

Power requirements for emerging leading edge technology microprocessors have become very difficult to satisfy. As the speed and integration of microprocessors increases, the demands on the power regulation system increase. In particular, as gate counts increase, the power regulation current demand increases, the operating voltage decreases and transient events (e.g. relatively large voltage spikes or droops at the load) typically increase in both magnitude and frequency. Some emerging microprocessors are expected to run on less than 1.3 volts and more than 100 amperes.

SPC's utilizing step-down multi-phase Buck converters have been the preferred topology to meet the low voltage and high current requirements of microprocessors. With the advent of increasingly complex power regulation topologies, digital techniques for power converter control, specifically in multiphase designs, can improve precision and reduce the system's total parts count while also supporting multiple applications in the same power system through digitally programmable feedback control.

Existing feedback controls have taken voltage measurements from the load, as well as from the individual output phases. The feedback information has been used to adjust the duty cycle, i.e. width of the pulses produced by each of the phases of a multi-phase buck regulator system to bring the supplied voltage and current within the load line tolerances specified by the microprocessor manufacturer. Such a multi-phase pulse width modulated (PWM) voltage regulator system has been disclosed in the patent applications cross-referenced hereinabove and the details of those disclosures are incorporated herein by reference. In particular, the co-pending patent application entitled: DIGITAL CALIBRATION WITH LOSSLESS SENSING IN A MULTIPHASE SWITCHED POWER CONVERTER, Ser. No. 10/884,840, filed Jul. 2, 2004, inventors: Southwell et al, of which an inventor of this application is a co-inventor, teaches a novel lossless technique for sensing current at the load that is provided in a feedback loop to bring the supplied voltage and current within the specified load line tolerances.

Active Transient Response (ATR) has been used for high frequency response to rapidly changing power requirements at the load by quickly activating multiple phases to supply or drain (as the case required) more current to or from the load, thereby temporarily over riding the generally slower overall voltage regulator system response. Such power regulation systems utilizing ATR have been disclosed in detail in the patent applications cross-referenced hereinabove and the details of those disclosures are incorporated herein by reference. In particular, the co-pending patent application entitled: SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy et al, of which an inventor of this application is a co-inventor, discloses a power regulation system having an active transient response (ATR) circuit.

The use of ATR enables voltage regulator systems to be designed with lower overall output capacitance while maintaining equivalent dynamic performance. An ATR circuit includes a window comparator that compares the output supply voltage at the load to the reference voltage, as determined by the specified load line. As long as the output voltage remains within a specified tolerance range (i.e. window) above or below the specified load line, the ATR circuit provides no input signal to the PWM, which proceeds to provide power to the load in a conventional manner. On the other hand, as soon as the voltage is outside the "window", the ATR circuit signals the PWM to modify its operation. For example, if the voltage drops below the specified voltage range, all low side power switches in the multi-phase system are turned off and then, after a short delay, all high side power switches are turned on, causing the normally staggered inductor charging to occur in parallel.

Thus, when the voltage at the load increases above a specified voltage, the window comparator signals an ATRL (Active Transient Response Low) event. Such an ATRL event requires a rapid lowering of the voltage at the load. This is accomplished by turning on additional low side FETs and blocking the high side from providing the normal synchronous phase pulses. This effectively is a compensation operation that reduces the output voltage. Conversely, when the voltage at the load decreases above a specified voltage, the window comparator signals an ATRH (Active Transient Response High) event. Such an ATRH event causes the high side FETs to increase their duty cycle. This effectively is a compensation operation that increases the output voltage back to within the specified window. This technique of compensating for transients causing over voltage and under voltage conditions is enhanced by adjusting the window comparator to a specified load line. By using AVP (Adaptive Voltage Positioning) as a reference "target voltage", correction of under voltage and over voltage excursions is improved.

However, as the power regulation needs of load devices such as microprocessors and the like become even more demanding, even more precise ATR techniques than those disclosed in the aforementioned Duffy et al application, are desired. In particular, it is desired to more precisely detect and compensate the magnitude of the voltage excursion from the target voltage.

SUMMARY OF THE INVENTION

Accordingly, the present application describes ATR techniques for more accurately detecting voltage excursions from the specified load line (i.e. the target voltage). In particular, the present invention discloses a multi-level sensing technique that detects not only the fact that the voltage excursion requires an active transient response but also detects the amplitude of the excursion. In accordance with the invention, it has been found highly desirable to sense multiple thresholds, particularly multiple ATRH thresholds.

In particular, the invention provides multiple threshold based detection of under voltage that determines how many high-side phases need to be activated to maximize output current slew rate. For example, if the transient is slight, only one phase will respond. If the transient is severe, up to three additional phases (e.g. in the case of a system with four or more phases) can respond. Thus, a plurality of asynchronous pulses is provided on one or more of those phases asynchronously. As previously noted, by the presently disclosed method, the number of thresholds exceeded by the voltage excursion is detected. In short, the number of correction pulses provided is a function of the number of voltage thresholds that are exceeded. In this way, the multi-threshold sensing scheme allows variable gain to be applied by the ATR circuit by varying the number of ATR pulses that are generated so that the correction to the ATR event is in proportion to the magnitude of the sudden voltage excursion, i.e. transient.

In accordance with the invention, the multi-threshold sensing technique can be programmed to detect the amplitude of the excursion within desired parameters. The detected excursion is then used to provide an adjustment to the supply voltage that is more precise than would be possible with a less precisely detected excursion. The capability for such rapid enhanced response to transients allows a reduction in the bulk of output capacitors used in Buck regulators.

In accordance with the invention, an Adaptive Voltage Positioning (AVP) circuit determines the voltage/current requirements to track the specified load line, which in combination with the multi-threshold multi-gain ATR provides voltage regulator with enhanced performance. In this case, the target voltage is a variable voltage in accordance with the specified load line. Accordingly, the target voltage used as a reference for correcting for under voltage and over voltage conditions, combined with the multilevel sensing and multi-gain correction provide an improved response to transient excursions.

By way of further example, in case of an over voltage condition, the ATR circuit can activate additional low-side phases, in addition to blocking high-side pulses to maximize output current slew rate. As will become more apparent in the following more detailed description, the ATR circuit of this invention is asynchronous relative to the synchronous PWM pulse generation. However, as a further feature, the invention provides a method of selecting phases when the correction pulses are applied in accordance with a predetermined scheduled timing relative to the synchronous pulse width modulated pulses.

In accordance with another aspect of the invention, the AVP circuit includes a variable low pass filter that is adjusted in response to an ATR event. This resolves a conflict in the choice of AVP bandwidth. A low AVP bandwidth is desired to filter out current sense noise so that the AVP computation does not add a lot of noise to the output voltage. On the other hand, a high AVP bandwidth is desired for passing transients so that the transient response looks as close to an ideal voltage step as possible. By opening up the AVP bandwidth, the amount of overshoot associated with an ATRH event is reduced.

In accordance with a still further aspect of the invention, the AVP circuit is configured to receive pre-determined current values representing different threshold levels of an ATR event. A pre-positioning circuit receives these pre-determined current values from memory and provides them as an output when receiving a signal indicative of an ATRH event. The particular current value provided at the output depends on the degree of the ATRH event, i.e. ATRH1, ATRH2, or ATRH3. These pre-determined current values are added to the compensation voltage applied to the load at a time prior to the detection of current transients. The detection of transient current values at the load is delayed because the current must pass through an inductor.

These and other features of the invention will become more apparent in the following more detailed description and claims when considered in connection with the drawings where like reference numerals refer to similar elements throughout the Figures.

BRIEF DESCRIPTION OF THE DRAWINGS

FIG. 8 is a series of pulse train diagrams illustrating the system timing for a system having four phases;

FIG. 11 is a chart illustrating the high side ATR (ATRH) schedule for a system having multiple phases.

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g. resistors, transistors, capacitors, inductors and the like, whose values may be suitably configured for various intended purposes. Any actual values provided for such components as well as applied voltage levels and currents are intended by way of example and not limitation.

In addition, the present invention may be practiced in any integrated circuit application. Such general applications and other details that will be apparent to those skilled in the art in light of the present disclosure are not described in detail herein. Further, it should be noted that while various components may be suitably coupled or connected to other components within exemplary circuits, such connections and couplings can be realized by direct connection between components, or by connection through other components and devices located therebetween.

Figure 1:
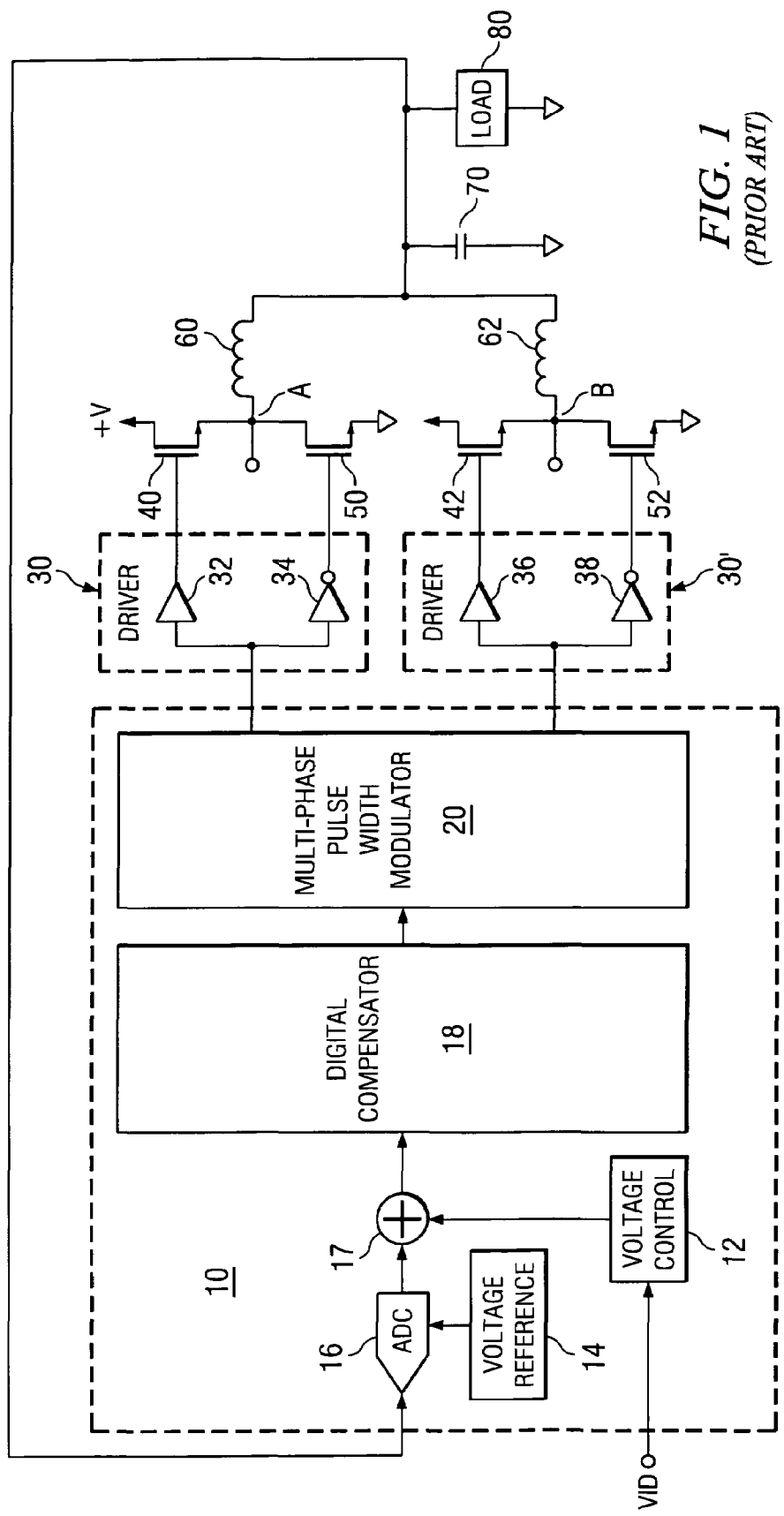
FIG. 1 is a schematic diagram of a digital multiphase buck regulator that was disclosed in some of the related patent applications cross-referenced herein.

Refer now to FIG. 1, which is a schematic diagram of a Digital Multiphase Buck Regulator that has previously been described in detail, for example, in the cross-referenced patent applications that have been incorporated herein by reference. It is also known as a Digital Multiphase Buck Converter because it converts a relatively high supply potential (+V) at e.g. 12 volts to a low voltage, e.g. 1 to 3 volts provided to a load at very high current levels. Digital controller 10 is shown including Digital Multi-phase Pulse Width Modulator (PWM) 20, although frequently PWM 20 is depicted as a distinct power stage. The output of PWM 20 is a series of pulses on each of output lines, the phase 1 output being provided to driver 30 and the phase 2 output being provided to driver circuit 30'. In a multi-phase system having more than 2 phases, additional phases are connected in a similar manner. Low side FETs 50 and 52, inductors 60 and 62, and capacitor 70 are typically discrete devices. In each phase, (say phase 1 for example), a pulse output stage comprises a high side FET (40), a low side FET (50) and an inductor (60). Similarly, the pulse output stage for phase 2 comprises a high side FET 42, a low side FET 52 and an inductor 62. The pulse output stage charges up capacitor 70 and supplies power to the load. Load 80 is typically a microelectronic component, such as a microprocessor, requiring very accurate power that is regulated and maintained during rapidly changing power requirements.

Digital controller 10 receives a VID input at voltage control 12. VID is a digital number provided by the microprocessor manufacturer describing specific power requirements, in particular the set point, i.e. initial load line voltage at minimum current. Digital controller 10 can also have a reference voltage 14 that is applied to analog-digital converter 16 that also receives, as a second input, the voltage at load 80. The reference voltage from block 14 is used to calibrate the output of analog to digital converter ADC 16 to that reference voltage. The output of ADC 16 is a digital voltage value that is compared to the output of voltage control circuit 12 (the target voltage) in summer 17 and provided as a digital error voltage to digital compensator 18. Digital compensators such as digital compensator 18 that provide inputs to multi-phase pulse width modulators, such as PWM 20 are well known and described for example in the above cross-referenced patent application, SYSTEM, DEVICE AND METHOD FOR PROVIDING VOLTAGE REGULATION TO A MICROELECTRONIC. DEVICE, Ser. No. 10/103,980, filed Mar. 22, 2002, inventors: Duffy et al. of which an inventor in this application is a coinventor. Digital compensator 18 then provides an input to PWM 20 in order to modify the width of the pulses provided to the drivers 30 and 30', etc. of each of the two phases in the illustrated example, and other phases, when utilized. Phase 1 is driven by driver circuits 32 and 34. Circuit 32 drives the gate of FET 40 with a signal that is complementary to the output of circuit 34 that drives the gate of FET 50. FET 40 and 50 have their drain-source paths connected in series, at a common point A, between a first potential source (+V) and a second potential source (ground). Since both FET 40 and 50 are shown as N-channel devices, only one of the two transistors is on at any one time. Of course, if transistor 40 were to be replaced with a P-type transistor, then the same phase signal could be used to drive the gate of both transistor 40 and 50. In either case, there is never a direct current path between +V and ground.

The phase 2 output of PWM 20 is provided to circuits 36 and 38 during phase 2 time in the same way that circuits 32 and 34 receive the pulse width modulate signals during phase 1 time. Circuit 36 then drives the gate of FET 42 and circuit 38 drives the gate of FET 52. Note that although two phases are shown, any number of phases can be used. Larger number of phases provides smoother and more accurate power to the load.

In operation, during phase 1, while the pulse width modulated waveform turns high side FET 40 on, current flows through FET 40 into node A and through inductor 60 to charge capacitor 70 and provide power to load 80. On the other hand, when low side FET 50 is turned on, current flows through FET 50. High side FET 42 and low side FET 52, connected in common at node B operate in a similar manner during phase 2. The voltage from the load 80 is fed back to ADC 16 so that the voltage to the load can be adjusted to changing load conditions. It is desirable to also measure the voltage at node A and node B (and other corresponding nodes in systems with more phases) as an indication of the current being supplied to the load. The cross-referenced patent applications show how the measurements taken at nodes A and B are then used to better regulate the power provided to load 80. Although such a system operates satisfactorily, it has been found that for more rapid response to high speed variations in the power requirements of load 80, a second voltage adjustment technique is desired. In particular, when the voltage excursion from the load line exceeds a predetermined specified amount, then a secondary power adjustment is provided by active transient response (ATR) circuitry.

Figure 2A:
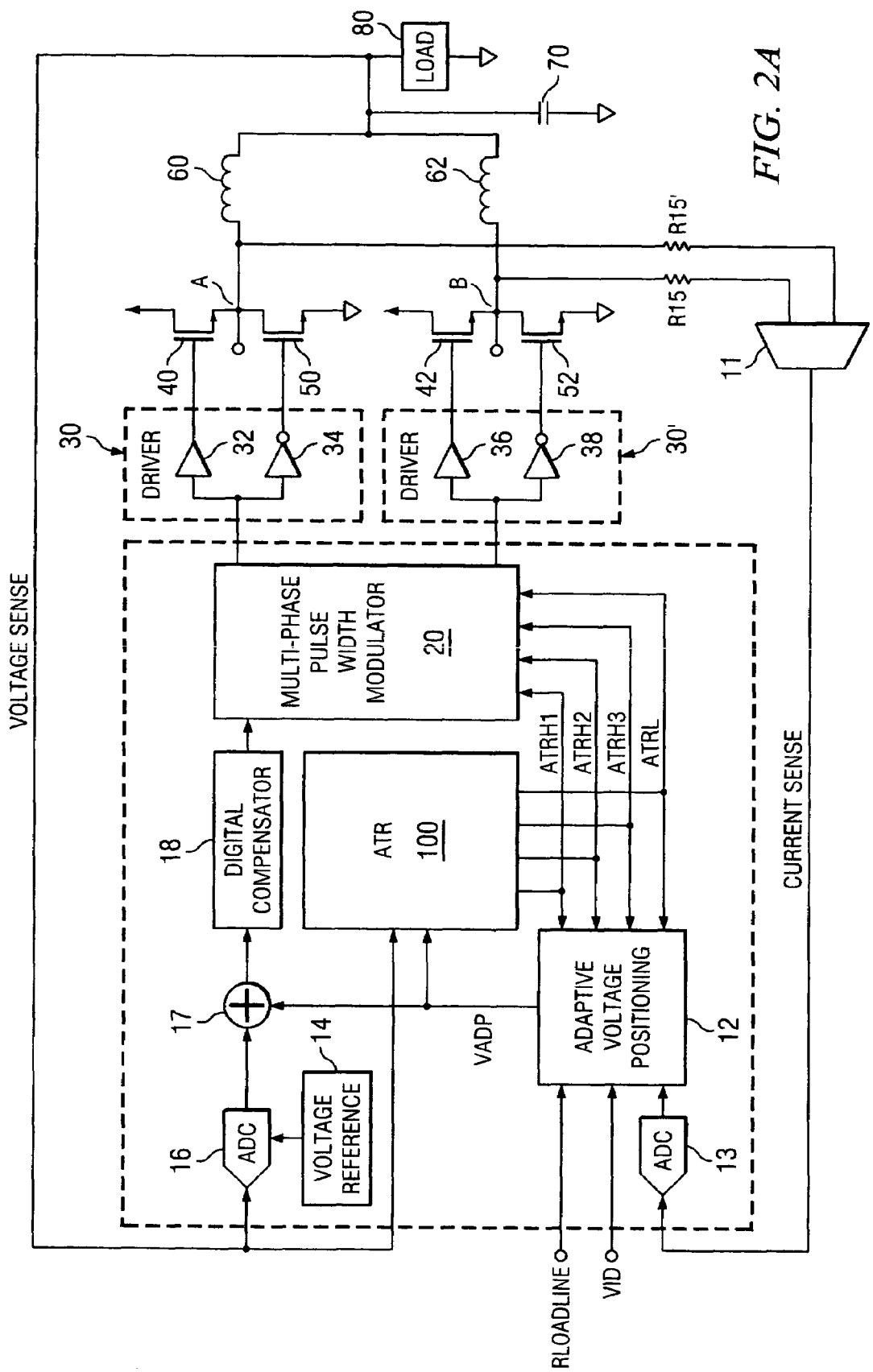
FIG. 2A is a schematic diagram of an embodiment of the invention illustrating the connection of the ATR circuits.

Refer now to FIG. 2A, which is a schematic diagram of one embodiment of this invention. Components corresponding to FIG. 1 have been identified with corresponding reference numerals. Multi-phase pulse width modulator 20 is coupled to the pulse output stage of each phase through drivers 30 and 30'. As in FIG. 1, each pulse output stage comprises a high side FET (40, 42), a low side FET (50, 52) and an inductor (60, 62), as a two phase system is shown. Additional phases would comprise similar structure.

In the FIG. 2A embodiment, voltage control is provided by Adaptive Voltage Positioning block AVP12. As in FIG. 1, AVP12 gets a VID input. As shown in FIG. 2A, AVP12 also gets an RLOADLINE input, which is a number provided by micropressor manufacturers indicating the desired slope of the load line. AVP 12 receives an additional input from current ADC13. Current from all the phases at the nodes (node A and node B in the illustrated two phase example) is sensed through resistor R15 and resistor R15', clocked through multiplex circuit 11 at the active phase time and converted to a digital value in ADC 13. This permits AVP12 to provide an adjustment to the target voltage number provided to comparator 17 and active transient response circuit ATR circuit 100. Thus, the target voltage is determined by AVP circuit 12 which adjusts the target voltage in accordance with the specified load line. In addition, AVP12 receives inputs from ATR circuit 100 for providing early and predictive correction of the target voltage, as will be described in greater detail hereinbelow.

ATR circuit 100 is coupled between the output stage, at load 80 and multi-phase PWM20 and is configured to detect the voltage level at the load. In case the transient voltage at the load deviates from the target voltage by one or more of the pre-set thresholds, ATR100 provides a signal to PWM20 that is a function of the amplitude of the deviation of the detected voltage from the target voltage. The ATR100 output will be one of: ATRL, ATRH1, ATRH2, or ATRH3.

ATR100 is also coupled between the output stage, at load 80, and AVP12 to provide one of the signals indicative of an ATR event, i.e. one of ATR signals (ATRL, ATRH1, ATRH2, or ATRH3) to AVP12. This enables AVP12 to provide an early, predictive change to summer 17. This predictive change can occur prior to the time that the sensed current change is received from ADC13 because the sensed load current change is delayed passing through inductors 60, 62, and other similar inductors in additional phases.

As long as the voltage at the load is maintained within predetermined limits, ATR circuit 100 is not activated and no output signals are provided by ATR circuit 100. However, when the changes in power demands by the load result in a voltage excursion at the load that exceeds the predetermined limits ATR circuit 100 provides ATRL, ATRH1, ATRH2, or ATRH3 signals to PWM generator 20 to correct the voltage deviation rapidly and with minimal noise generation. As shown in FIG. 2A, these same signals are provided to AVP12.

Figure 2B:
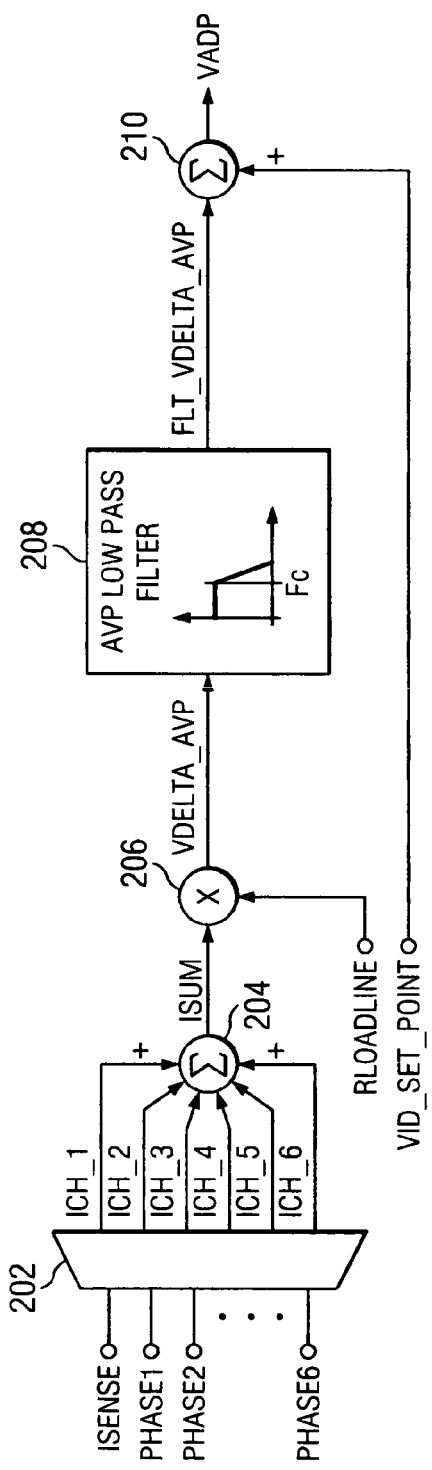
FIG. 2B illustrates an exemplary AVP circuit.

Refer now to FIG. 2B illustrating one embodiment of ADP12. The sensed current from ADC 13 is received at demultiplexer circuit (demux) 202. Demux 202 also receives a phase clock corresponding to the time of each phase output of PWM 20. In this case, a six phase example is illustrated so that there are in fact 6 phase clock inputs. Demux 202 provides each of the channel currents ICH1, ICH2, ICH3, ICH4, ICH5, and ICH6 to summer circuit 204, which in turn provides the sum of the currents (ISUM) on all of the channels to multiplier circuit circuit 206. ISUM is thus the rotating sum of the currents of all phases. The output of summing circuit 204 is provided to multiplier circuit 206, where it is multiplied by RLOADLINE, which is a constant number representing the specified slope of the load line. The output of multiplier 206 is therefore a voltage value representing the change in voltage (VDELTA_AVP) resulting from the changing total current ISUM. This value is passed through a low pass digital filter in order to pass as little ripple noise as possible. The filtered output voltage (FILT VDELTA AVP) is provided to summing circuit 210, which also receives the VID input. Vout, the output of summing circuit 210 is then the VID set point value as modified by the sensed current. Although an AVP12 in accordance with this embodiment operates satisfactorily, it has also been found that Vout is delayed undesirably. This is due to the fact that the sensed current input to DEMUX202 is delayed in time because current at load 80 is sensed through N inductors 60, 62, etc. (N being the number of phases in a system.) The elimination of this delay and other improvements are provided by the circuit of FIG. 2C.

Figure 2E:
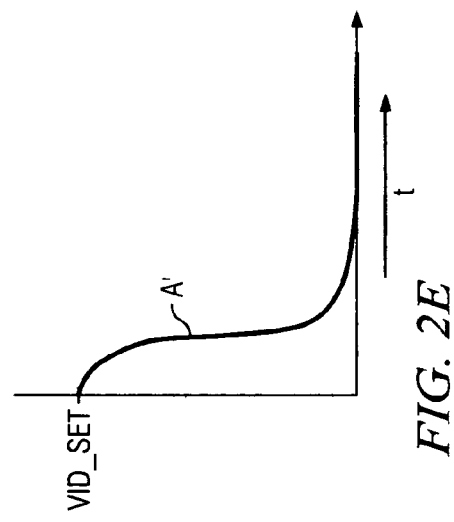
FIGS. 2D and 2E are waveform diagrams.
Figure 2D:
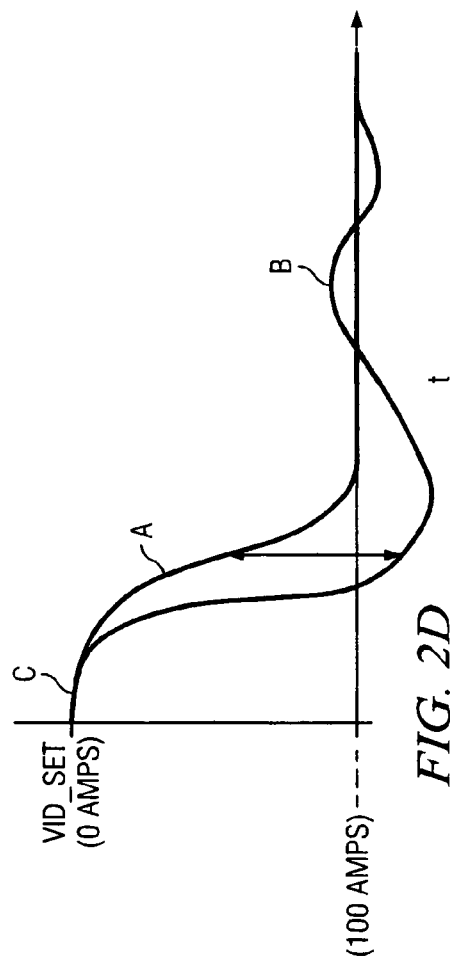
Figure 2C:
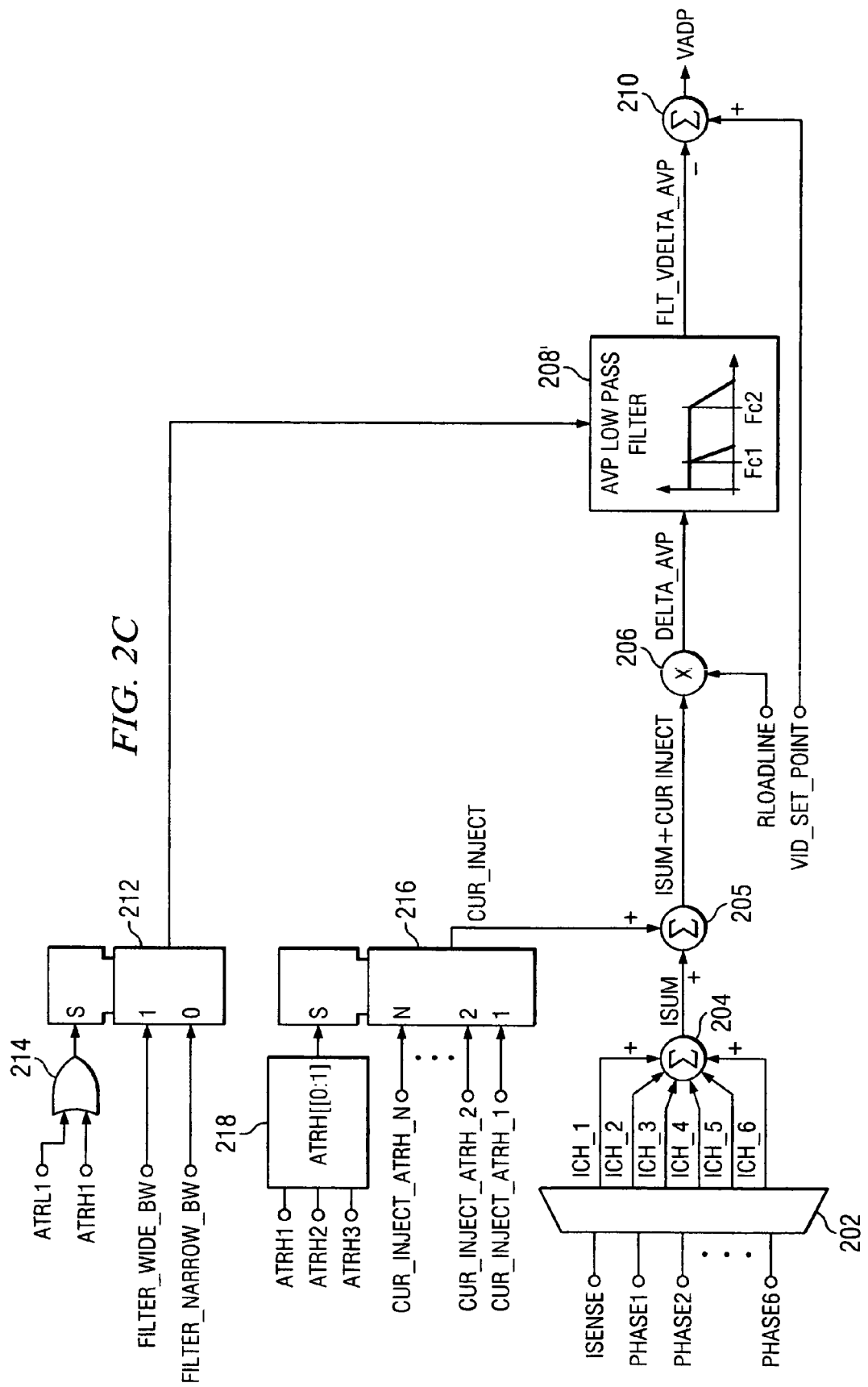
FIG. 2C illustrates another embodiment of an AVP circuit.

Refer now to FIG. 2C in which elements corresponding to FIG. 2B have been similarly numbered and function in the same manner. The aforementioned elimination of delay is provided at summing circuit 205, which receives a pre-positioning signal (CUR INJECT) which is added to ISUM to produce ISUM+CUR INJECT. This larger current value is multiplied by the RLOADLINE (load line slope constant) to produce a larger DELTA AVP. This larger changed voltage value is provided to digital low pass filter 208', which is also improved from the FIG. 2B embodiment.

In particular, for normal signals, it is desired that a digital filter, such as 208', have a narrow bandwidth with filter coefficients set at FC1, for example to filter out ripple noise so that the AVP computation doesn't add a lot of noise to the output voltage. However, for high frequency transient signals a wide bandwidth filter with filter coefficients set at FC2, for example, is desired so that transient response looks as close to an ideal voltage step as possible. These coefficients are set by 2:1 multiplex circuit 212, as will now be described.

Circuit 212 receives a (FILTER_WIDE_BW) input when there is either an ATRL or an ATRH event. The second input (FILTER_NARROW_BW) is active when there is no ATR event. OR circuit 214 is also provided to provide an input to circuit 212 when either an ATRL1 or an ATRHL1 event occurs. Circuit 212 will pass the FILTER_WIDE_BW signal when S=1, i.e. either ATRL1 or ATRH1 is up. Conversely circuit 212 will pass FILTER_NARROW_BW when S=0. Depending on which of these signals is inputted to digital filter 208', it will operate with coefficient FC1 or FC2.

Pre-positioning circuit 216 receives pre-stored inputs (from memory not shown) representing current values corresponding to ATRH thresholds exceeded. For example, CUR_INJECT_ATRH1 could be preset at 25 Amps. Then, CUR_INJECT_ATRH2 could be preset at 50 amps. CUR_INJECT_ATRH3 could be preset at 75 amps and so on for the N thresholds. Logic circuit 218 receives the inputs ATRH1, ATRH2 and ATRH3 from ATR circuit 100. Note that ATR circuit 100 receives a voltage sense input directly from the load 80. This voltage transient signal is received much more quickly than the current sense signal transient which must pass through an inductor, e.g. 60, 62, etc. In response to a voltage transient, ATR circuit 100 inputs to logic circuit 218, the ATRH threshold (if any) that has been triggered. In response, circuit 216 provides the pre-programmed values of CUR_INJECT to summing circuit 205. For example, the respective pre-programmed values of CUR_INJECT can be: 0 amps (no ATR), 25 amps (ATRH1 event), 50 amps (ATRH2 event) or 75 amps (ATRH3 event). In turn, summer 205 provides the sum of the currents ISUM+CUR_INJECT to multiplier 206. The output of circuit 206 is a voltage (DELTA_AVP) that is the product of RLOADLINE (the slope of the load line) and the current. It is the function of AVP Low pass filter 208' to filter this voltage. Filter 208' receives a signal from circuit 212 and depending on that signal acts as a low pass filter either with coefficient FC1 or FC2 to provide the filtered output to summer 210. Summer 210 combined the VID_SET_POINT value with the filtered voltage value as the output of the AVP12 circuit.

FIG. 2D illustrates the improved waveform provided by using variable digital filter 208'. Waveform A is provided by using digital filter 208' while waveform B shows the waveform that is provided when digital filter 208' is not tuned to the correct bandwidth. The significant difference in the two waveforms is illustrated by the arrow. The values of 0 Amps and 100 Amps are shown by way of example. With further reference to the waveform in FIG. 2D, note that it has a delay "C". This delay has been eliminated in waveform A' in FIG. 2E, which essentially is the same waveform A shown in FIG. 2D, but without the delay. As previously described, the delay is eliminated with pre-positioning circuit 216.

Figure 3:
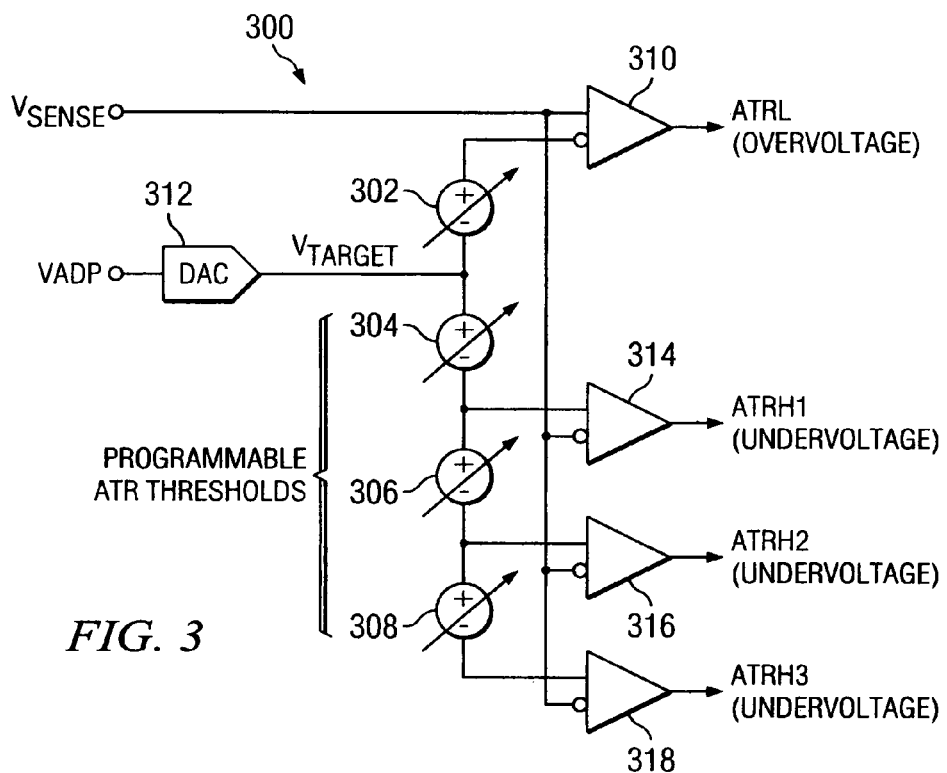
FIG. 3 is a schematic diagram of an ATR comparator circuit in accordance with the invention.

Refer now to FIG. 3 for a more detailed description of the comparator circuit 300 used in the ATR circuit 100. The comparator comprises 4 programmable threshold setting circuits 302, 304, 306, and 308. Threshold detector 302: 1. Receives as an input, the analog value of the target voltage VADP from AVP12, 2. Adjusts that input by an amount that is the ATRL threshold e.g. 50 mv and 3. Provides that value to comparator circuit 310. Comparator circuit 310 also receives, as a second input, the actual voltage sensed at the load. Since the VADP reference signal is in digital form, it is converted to an analog value in DAC312. Thus, whenever the voltage sensed at the load has an excursion that exceeds the ATRL threshold, comparator circuit 310 provides an output that indicates that there is an ATRL event. Comparator circuit 310 is configured to receive the aforementioned input signals in analog form and to provide the output in digital form. Those skilled in the art will know of various topologies for comparing two analog signals and providing a digital output (e.g. with an analog to digital converter integrated with the compare circuit. The ATRL pulse blocks the high side FETs and turns on the low side FETs as the output of the pulse width modulator 20 provides complementary outputs.

The ATRH comparator circuits 314, 316, and 318 are configured in the same way and operate in a manner similar to comparator circuit 310. Threshold setting circuit 304 sets the threshold voltage level ATRH1 for comparator 314. When the Vsense voltage deviates (in a negative direction in case of an ATRH event) to a greater value than the threshold voltage provided by block 304, comparator 314 provides a high level logic signal indicating an ATRH1 event. If the Vsense voltage deviates to a greater value than the threshold value provided by block 306, comparator 316 provides a signal indicating an ATRH2 event. If the Vsense voltage deviates to a greater value than the threshold value provided by block 308, comparator 318 provides a signal indicating an ATRH3 event.

Figure 4:
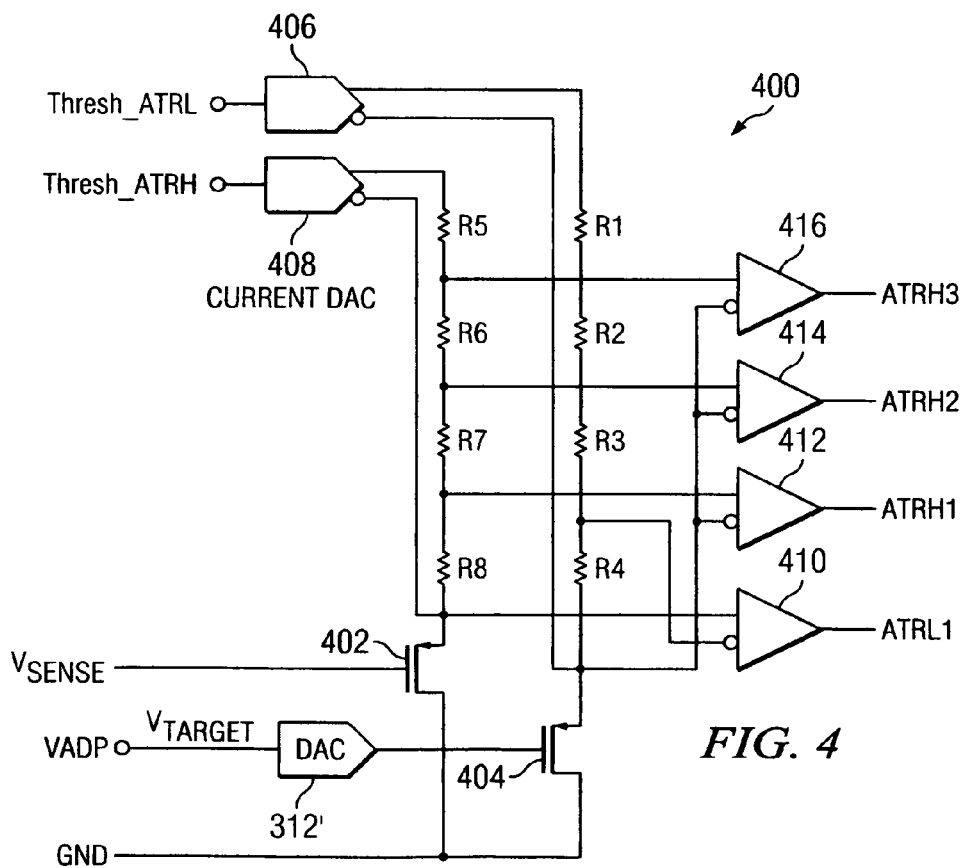
FIG. 4 is a circuit diagram illustrating the detection of multiple thresholds.

Refer now to FIG. 4, for a description of the multi-threshold ATR comparator circuit 400. The output voltage Vsense is received from the load at the gate of FET402. The analog value of VADP, i.e. Vtarget, is received at the gate of FET404, as converted into analog form by DAC312'. DAC406 receives the pre-determined ATRL threshold level in digital form and provides an analog current to a voltage divider comprising Resistors R1, R2, R3, and R4. The voltage at the common connection of R3 and R4 then sets the ATRL threshold at comparator 410. DAC408 provides a current to a voltage divider comprising Resistors R5, R6, R7, and R8. DAC406 and DAC408 are differential current DACs that set the threshold for the ATR comparator circuits by generating an offset voltage across resistors R1-R4 and R5-R8, respectively.

The inputs Thresh_ATRL and Thresh_ATRH are programmable parameters stored in memory, which set the current DAC outputs. These programmable parameters are digital values permitting adjustment of ATRH1, ATRH2, and ATRH3 by simply modifying the value of the Thresh_ATRH input to current DAC 408. Similarly the ATRL threshold is programmable by simply adjusting the value of the Thresh_ATRL input to current DAC 406. Differential current outputs are used so that the current through FETs 402 and 404 are fixed independent of setting (i.e. the sum of the true and complement currents are a fixed value.)

In operation, the voltage at the common connection of R3 and R4 is applied as a first input to ATRL compare circuit 410. This voltage value is determined by: 1. the amplitude of the target voltage applied to the gate of FFT404, 2. the amplitude of the current supplied by DAC406 and 3. the value of the resistors in the voltage divider formed by R1, R2, R3, and R4. The voltage at the common connection of R8 and FET402 is applied to the second input to ATRL compare circuit 410. The voltage at this second input is determined by the amplitude of the sensed voltage applied at the gate of FET402. If the second input exceeds the first input, compare circuit 410 will signal an ATRL event (ATRL1) resulting in the blocking of high side FETs and turning on low side FETs.

Comparator circuits 412, 414, and 416 are configured and operate in a manner similar to just described circuit 410. Each of them receives a first input that is a function of the target voltage applied to the gate of FET404. Each of them receives a second input that is a function of the sensed voltage provided to the gate of FET402, the threshold setting current provided by current DAC 408 and the resistor values of R5, R6, R7, and R8. In particular, comparator circuit 412 receives the sensed input from the common connection between R7 and R8. In the event the voltage sensed at the common connection between R7 and R8 deviates from the target voltage by a value greater than the first threshold, then circuit 412 provides an output indicating an ATRH1 event. If the voltage at the common connection of R6 and R7 deviates from the target voltage by a value greater than the second threshold, as set in comparator circuit 414, then circuit 414 provides an output indicating an ATRH2 event. Lastly, if the voltage at the common connection of R5 and R6 deviates from the target voltage by a value greater than the third threshold, as set in comparator circuit 416, then circuit 416 provides an output indicating an ATRH3 event.

Thus, setting a single threshold at a voltage level in a positive direction (at a pre-determined voltage higher than the target voltage) permits detection of a deviation greater than the pre-determined voltage. The detection of such a deviation signals an ATRL event activating circuitry to rapidly reduce voltage at the load. On the other hand, setting multiple thresholds at voltage levels in a negative direction (at multiple voltage levels lower than the target voltage) permits detection of the size of the deviation from the target voltage. The detection of such multiple levels of deviation, i.e. transients, signals not only the existence of an ATRH event, but also the amplitude of the deviation, i.e. ATRH1, ATRH2, or ATRH3.

Figure 5:
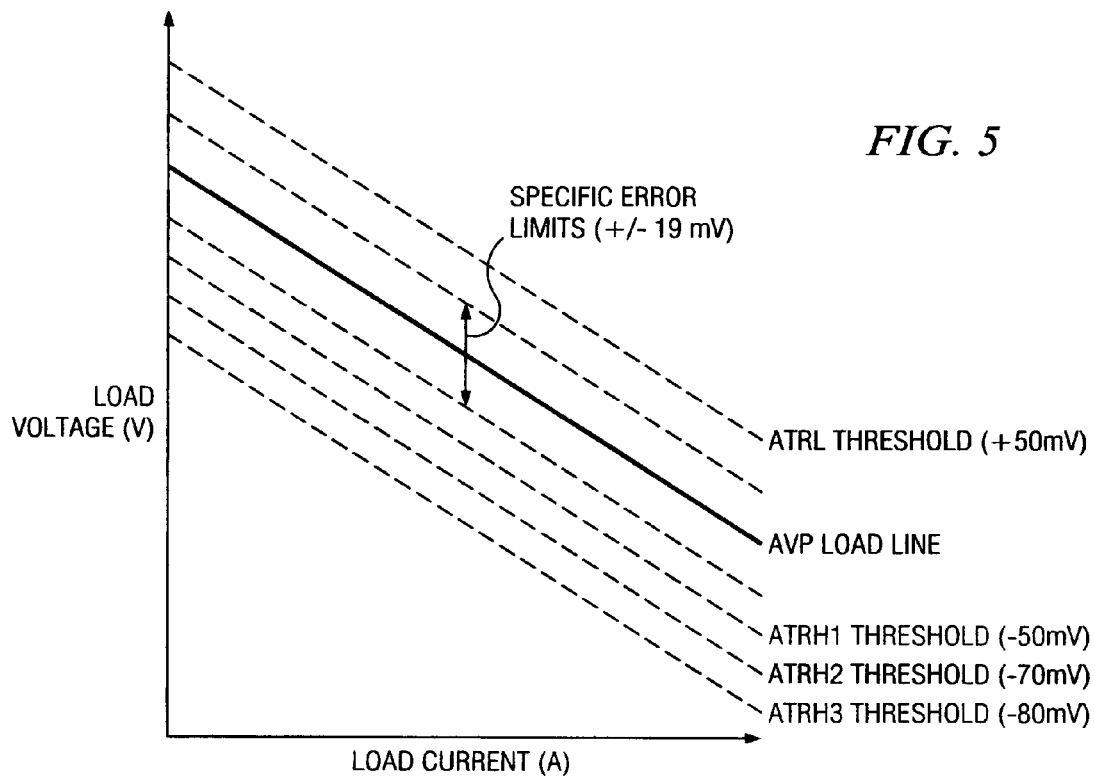
FIG. 5 is a waveform diagram illustrating a load line and exemplary thresholds for detecting an ATR event.

The operation of the ATR comparators and ATR circuit 400 will also be understood with reference to the waveform shown in FIG. 5. FIG. 5 shows an AVP load line well known in the art. The amplitudes of Load voltage (V), Load current (A) and the slope of the AVP Load line are specified by the manufacturer of the load. Most typically, loads requiring precisely controlled low voltage levels at high currents under rapidly changing load conditions are microprocessors, microcontrollers, and the like. The specified error limits shown are also provided by the manufacturer of the load. Under normal operating conditions, the voltage and current provided to the load are expected to stay within the specified error limits, for example +/−19 millivolts.

Under rapidly changing conditions, for example if the load suddenly requires far less current, the load at the voltage could exceed the AVP load line voltage by more than the pre-set ATRL threshold. This is an ATRL event that will cause the ATR circuit 100 to be activated to rapidly bring the load voltage towards the AVP load line. Similarly, if the load suddenly requires far more current, then the load voltage could decrease to an amount that would exceed one or more of the ATRH thresholds. This will be an ATRH event that will cause the ATR circuit 100 to be activated to rapidly bring the load voltage towards the AVP load line.

In accordance with the invention, it has been found highly desirable to have multiple thresholds, particularly multiple ATRH thresholds. All of the embodiments in this application disclose three ATRH thresholds, to wit, ATRH1, ATRH2 and ATRH3, which can be used to great advantage in PWM systems with 2-6 or more channels (phases). However, there is no practical reason why rather than 3 ATRH thresholds, 2, 4 or more ATRH thresholds could not be used. However, the use of multiple ATRH thresholds greatly improves circuit operation (as compared with a single ATRH threshold) and is more cost effective than 4 or more ATRH thresholds where the improved performance may reach the point of diminishing returns. The improvement in circuit operation is achieved by adjusting the magnitude of the ATR response to the magnitude of the excursion from the AVP load line.

The advantage of detecting multiple ATR thresholds is achieved by providing correction based on the magnitude of the excursion. This technique is shown in the waveform diagram of FIG. 6A; which shows exemplary timing pulses in a four phase system. The Vout waveform illustrates (in dotted lines) the likely output waveform when ATR is not used. A sudden high current demand causes the voltage to drop substantially and then gradually return to a lower steady state than the prior steady state level in accordance with the AVP load line. The method disclosed herein provides a pulse width modulator configured to provide multi-phase pulse outputs. In the FIG. 6A case, there are four channels (phases), to wit PWM1, PWM2, PWM3, and PWM4, each providing an output pulse during its assigned time slot, as shown. In accordance with the method, each of the illustrated pulses has a width (duty cycle) that can be narrower or wider to maintain the desired regulated voltage during normal operation.

Figure 6A:
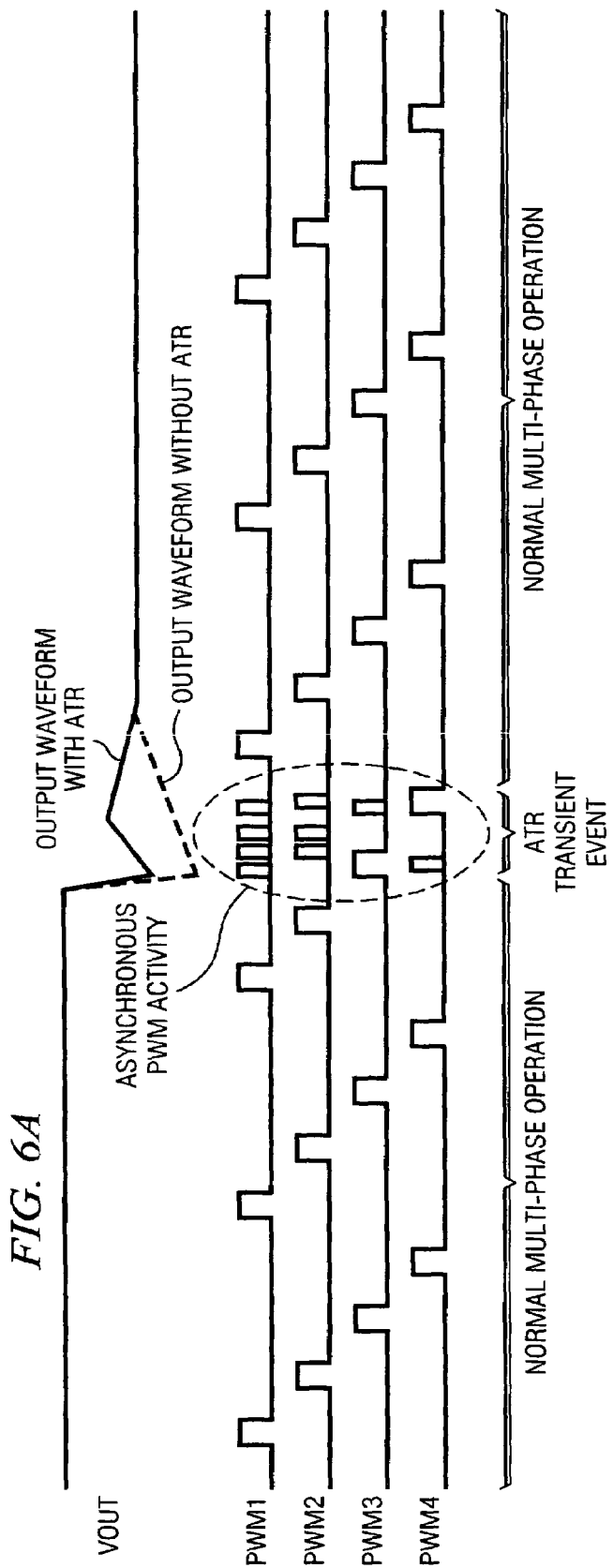
FIGS. 6A, 6B and 6C are waveform diagrams illustrating a set of exemplary pulses generated in response to an ATR event.
Figure 8:
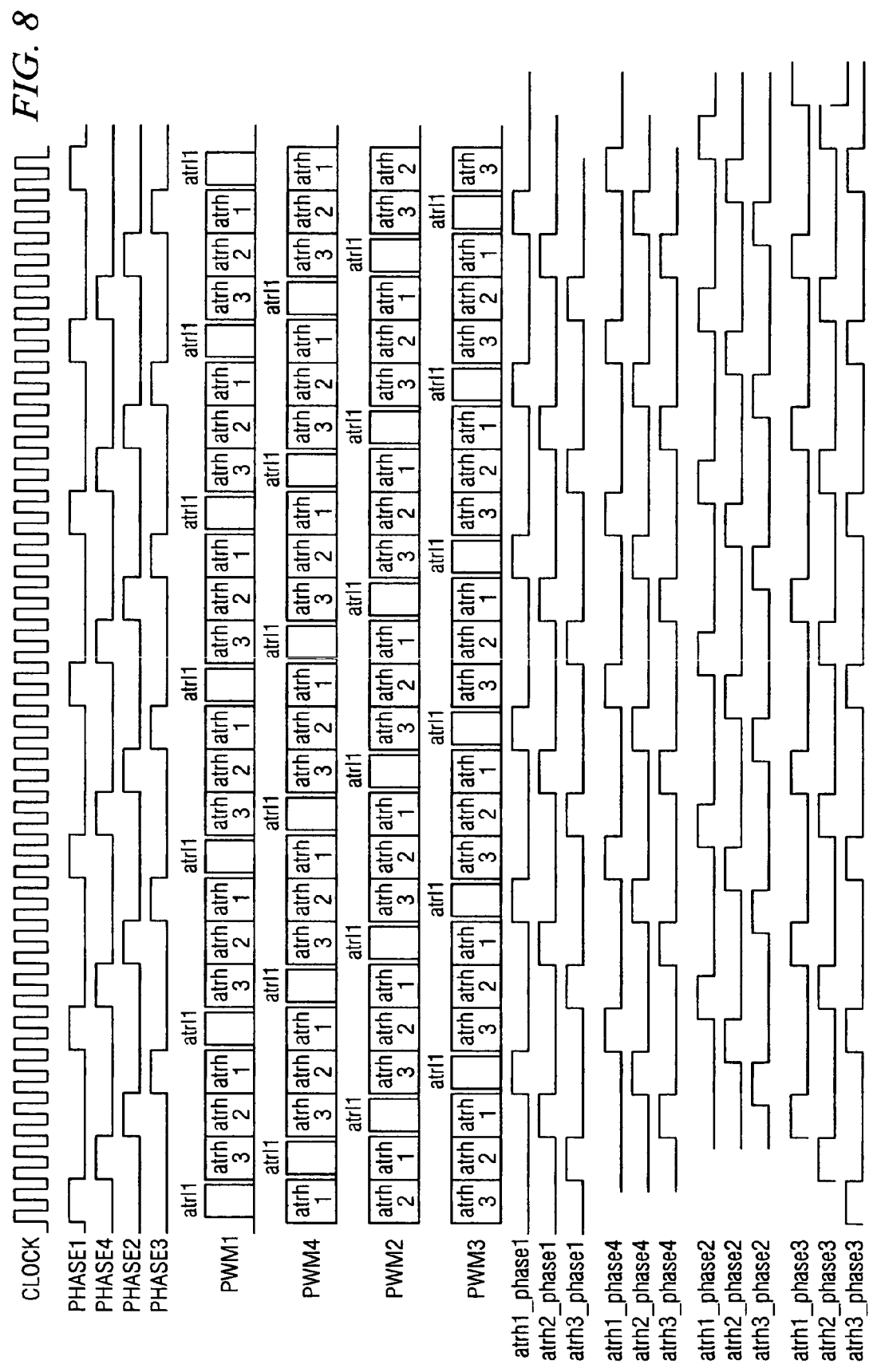

With continued reference to FIG. 6A, and in particular to the area identified as an ATR Transient Event, note the Asynchronous PWM Activity. In this method step, a plurality of asynchronous pulses are provided on one or more of those phases that are not already providing a "normal" synchronous pulse width modulated pulse output. As previously noted, by the presently disclosed method, the number of thresholds exceeded by the voltage excursion is detected. The number of correction pulses provided is a function of the number of voltage thresholds that are exceeded. Refer to line PWM1 which shows the occurrence of the first ATR pulse occurring shortly after the Vout voltage dropped. As illustrated, this first ATR pulse occurs at a point in time when the "normal" synchronous phase pulse PWM2 is already off and PWM3 is just turning on. This first pulse occurs in response to an ATRH1 event so that at this point only the first threshold has been exceeded. In some cases, it is possible that at this point the voltage excursion is returned to normal and no more ATR pulses are required. However, in the FIG. 8 illustration, additional ATR pulses are provided. As illustrated, a total of 4 ATR pulses occur on PWM1, 3 on PWM2, 1 on PWM3 and 1 on PWM 4. The last of the ATR pulses occur while "normal" synchronous PWM 4 is also on. As a result of the ATR pulses, the Vout voltage (solid line) dropped less than it would have without ATR. The multi-threshold sensing scheme allowed variable gain to be applied by the ATR circuit by varying the number of ATR pulses that are applied so that the correction to the ATR event is in proportion to the magnitude of the sudden voltage excursion, i.e. transient.

Figure 6B:
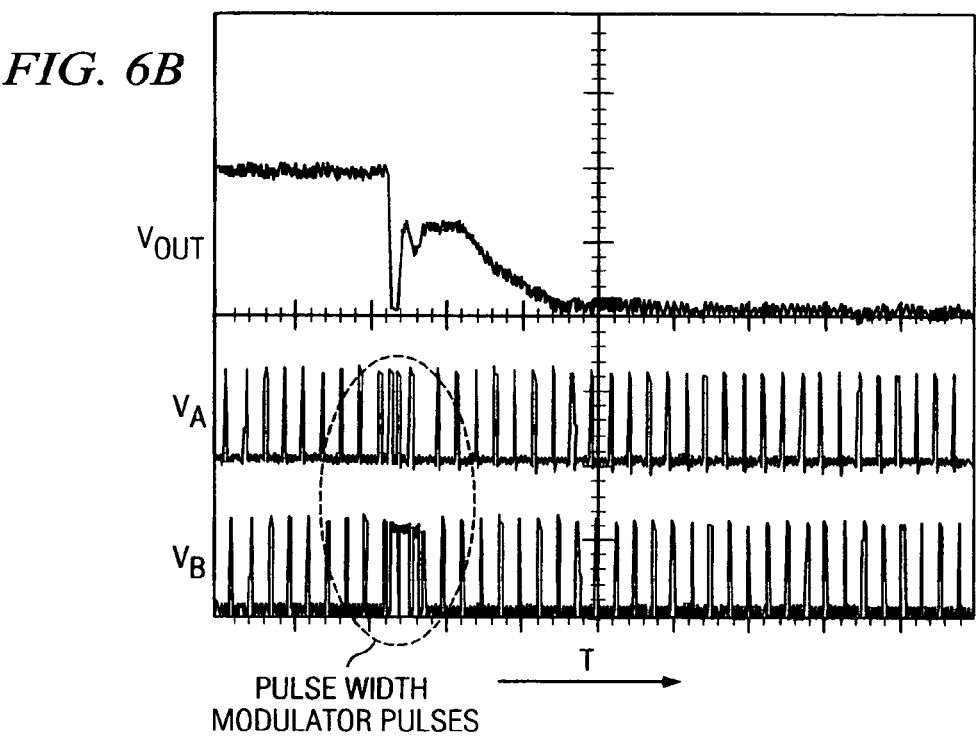
Figure 6C:
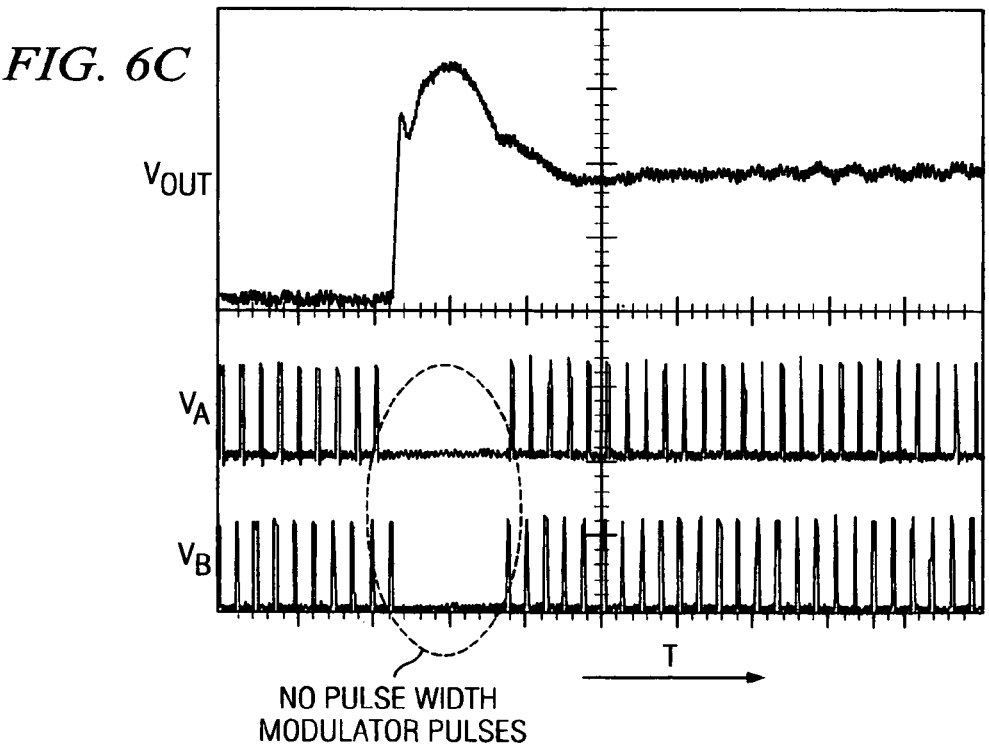

By way of further example, see FIG. 6B illustrating a two-phase system as in FIG. 2A. As previously noted, additional phases, when used, operate in a similar manner. Vout is the voltage at the load. Upon the occurrence of an ATRH event (a down transient sufficient to trigger one or more ATRH threshold levels), the extra PWM pulses (in the circled area) are found at node A ($V_A$) and node B($V_B$). Refer now to FIG. 6C; which illustrates how in the case of an ATRL event, the waveforms shown in FIG. C occur at Vout and nodes A and B. An up level transient that exceeds the ATRL threshold causes the ATRL event. Such an up level transient is caused when the current demand of the load decreases. In this case, PWM pulses are blocked at nodes A and B, by for example line ATRL1 in FIG. 7. This permits Vout to be brought down quickly from its up level spike. In each case (FIG. 6B and FIG. 6C), the new voltage level at Vout is set in accordance with the new current demands of the load causing the new voltage to be positioned in accordance with the load line (see FIG. 5) in accordance with known AVP techniques.

Figure 7:
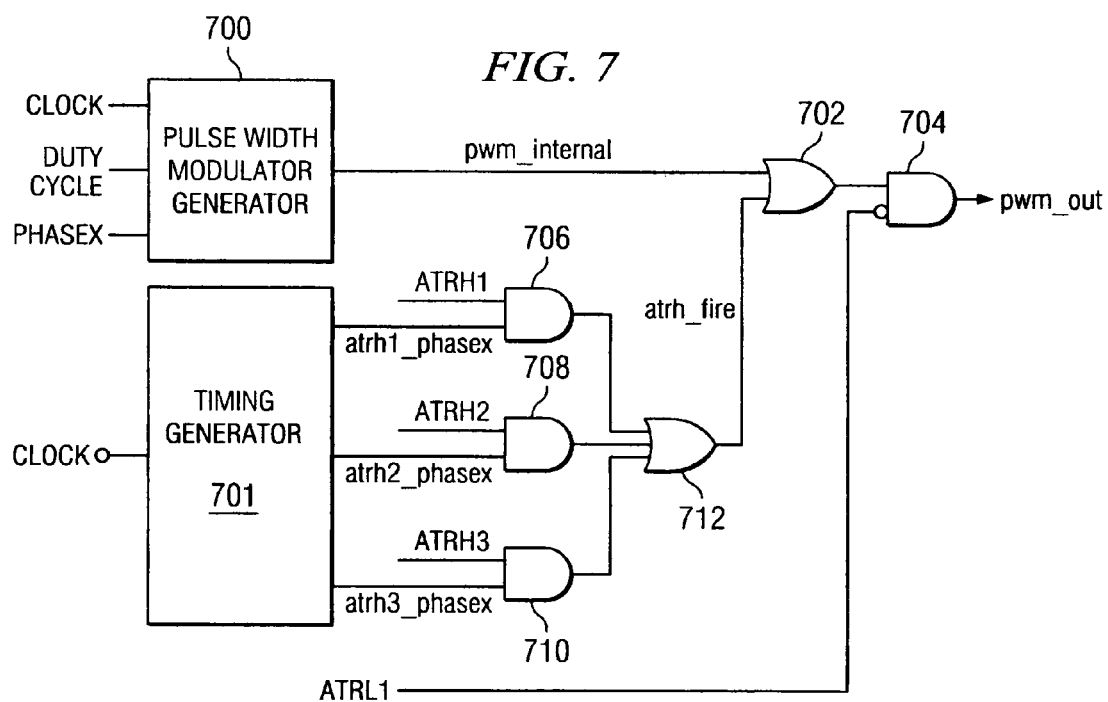
FIG. 7 is a schematic diagram illustrating the multi-gain aspect of the invention.

The multi-gain aspect is illustrated in greater detail in the schematic diagram of FIG. 7. For purposes of illustration, only one phase is shown. A multi-phase system will have one such FIG. 7 circuit for every phase. However, it will be appreciated by those skilled in the art that a feature of this invention is accomplished with the capability of providing ATR compensation pulses on one or more phases, in addition to the normal synchronous pulse width modulated phase pulses. PWM 700 receives a clocking signal and a phase signal (labeled phase x) for the particular phase with which it is associated. (In the four phase system illustrated in FIG. 8, these are the phase1, phase4, phase2 and phase3 signals.) It also receives a duty cycle signal from digital compensator 18 (FIG. 2A) to adjust the pulse width. The output is an internal pulse width modulated pulse train pwm_internal that is inputted to OR logic circuit 702, which in turn provides this signal to AND logic circuit 704. This pulse width modulated pulse train becomes the output of the multi-phase PWM generator, e.g. PWM 20 (FIG. 1). However, this pulse train output is blocked by AND logic circuit 704 when an input is received as an ATRL event, for example from ATRL1 (FIG. 3 or 4). In case of an ATRL event, the output voltage has exceeded the ATRL threshold (FIG. 5) and pulses are applied only through low side FETs to bring the output voltage down. In case the output voltage drops sufficiently below the AVP load line to exceed one or more of the ATRH thresholds (ATRH event), then a high level logic input is received at the corresponding AND logic circuit 706, 708, and 710. AND circuit 706 also receives a clocking signal ATRH1_PHASEX (from timing generator 701) in order to gate the ATRH1 signal through AND logic gate 706 at the appropriate time, as will be explained in connection with a timing diagram (FIG. 8). AND logic gate 706 passes this signal to OR logic gate 712, which in turn passes the signal through OR logic gate 702 to AND logic gate 704. Since an ATRH event will not occur simultaneously with an ATRL event, the ATRH1 signal will become the output pwm_out. The ATRH2 signal is clocked through AND logic gate 708 and the ATRH3 signal is clocked through AND logic gate 710 and eventually to the output pwm_out in the same way as ATRH1 at the occurrence of the corresponding PHASEX signal from timing generator 701.

Refer now to FIG. 8, which illustrates the timing of pulse signals in a four phase system. As illustrated, phase1, phase4, phase2 and phase 3 signals are generated to operate a four phase system. In the PWM1 waveform, the pulses that are labeled as ATRL1 are the "normal" synchronous pulses that occur during phase1 time, unless of course blocked by an ATRL event, in which case the low side FETs are turned on.

The operation of PWM4, PWM2 and PWM3 is similar. ATRL1 labeled pulses are provided by PWM4 during phase4 time. Similarly, PWM2 provides "normal" synchronous pulses during phase2 time and PWM3 provides "normal" synchronous pulses during phase3 time. The labeled pulses for the PWM1, PWM4, PWM2 and PWM3 occur as an ATRH output at the indicated time as gated by the timing pulses shown in the remainder of the FIG. 8 waveform diagram.

The pulse trains with the illustrated timing of the ATRHX_PHASEX signals are generated by timing generator 701 in response to the CLK input pulse. Thus, as shown in FIG. 8, the atrh1_phase1 clock signal gates the atrh1 signal to occur on PWM1 at the designated times, in case the atrh1 threshold was exceeded. Similarly the atrh1_phase4 pulse gates the atrh1 signal to PWM4. The atrh1-phase2 pulse gates the atrh1 signal to PWM2 and the atrh1_phase3 pulse gates the atrh1 signal to PWM3. In case the ATRH2 and ATRH3 thresholds are exceeded, these signals are similarly gated at the indicated times to the indicated channel of the pulse width modulator.

Figure 9:
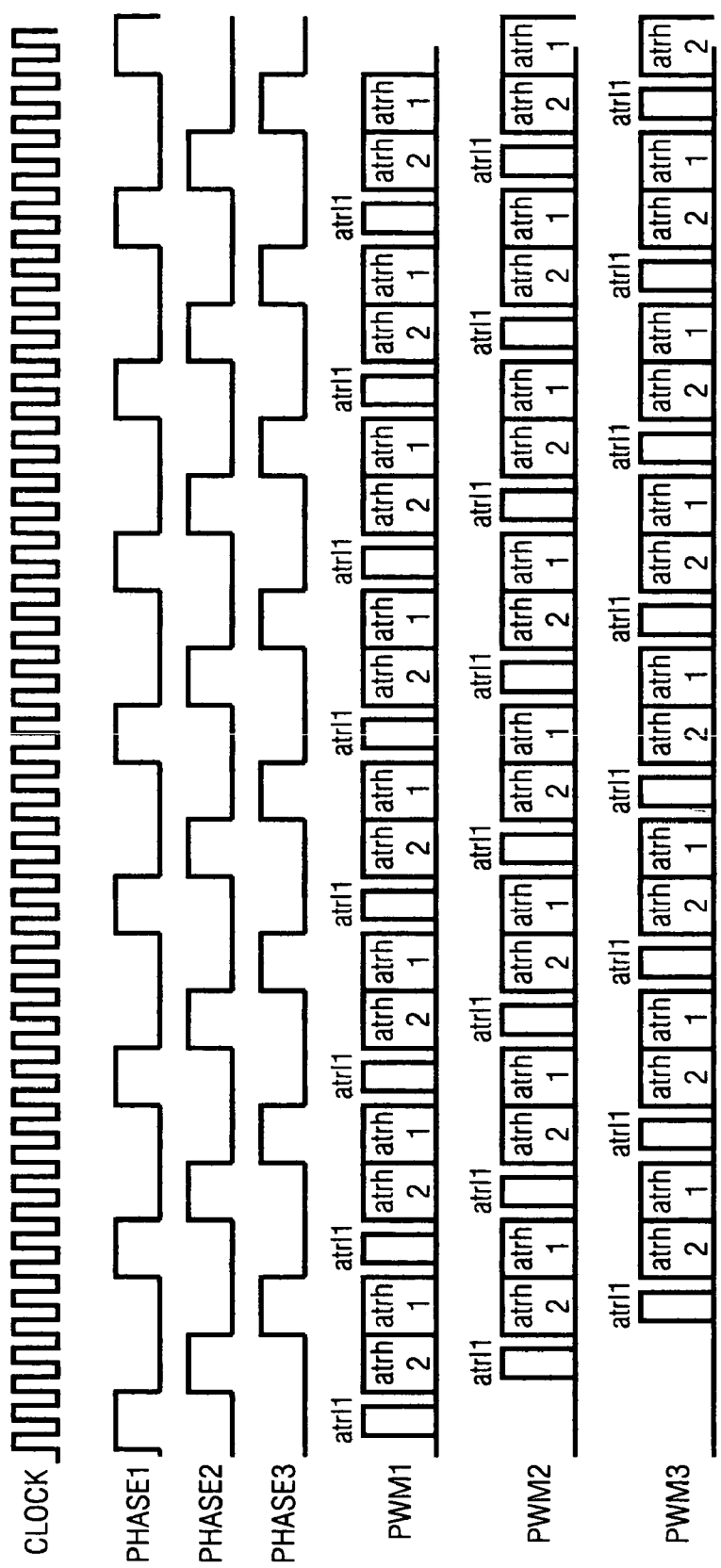
FIG. 9 is a series of pulse train diagrams illustrating the system timing for a system having three phases.

As previously noted, the three ATRH threshold level detection is useful not only in four phase systems but in a system with any number of phases. For example, see FIG. 9 which illustrates timing for a system having three phases. The various pulse trains: phase 1, phase2, phase 4, PWM1, PWM2, and PWM3 are generated as in the prior example; however with only 3 phases, as shown. With a 3 phase system, ATRH1 is activated when the first threshold is triggered and ATRH2 is activated when the second threshold is triggered. However, if and when the third threshold is triggered, the ATR circuit has no effect in a three phase system. Similarly, in a two phase system, in case of an ATRH event, only ATRH1 correction pulses are provided.

Figure 10:
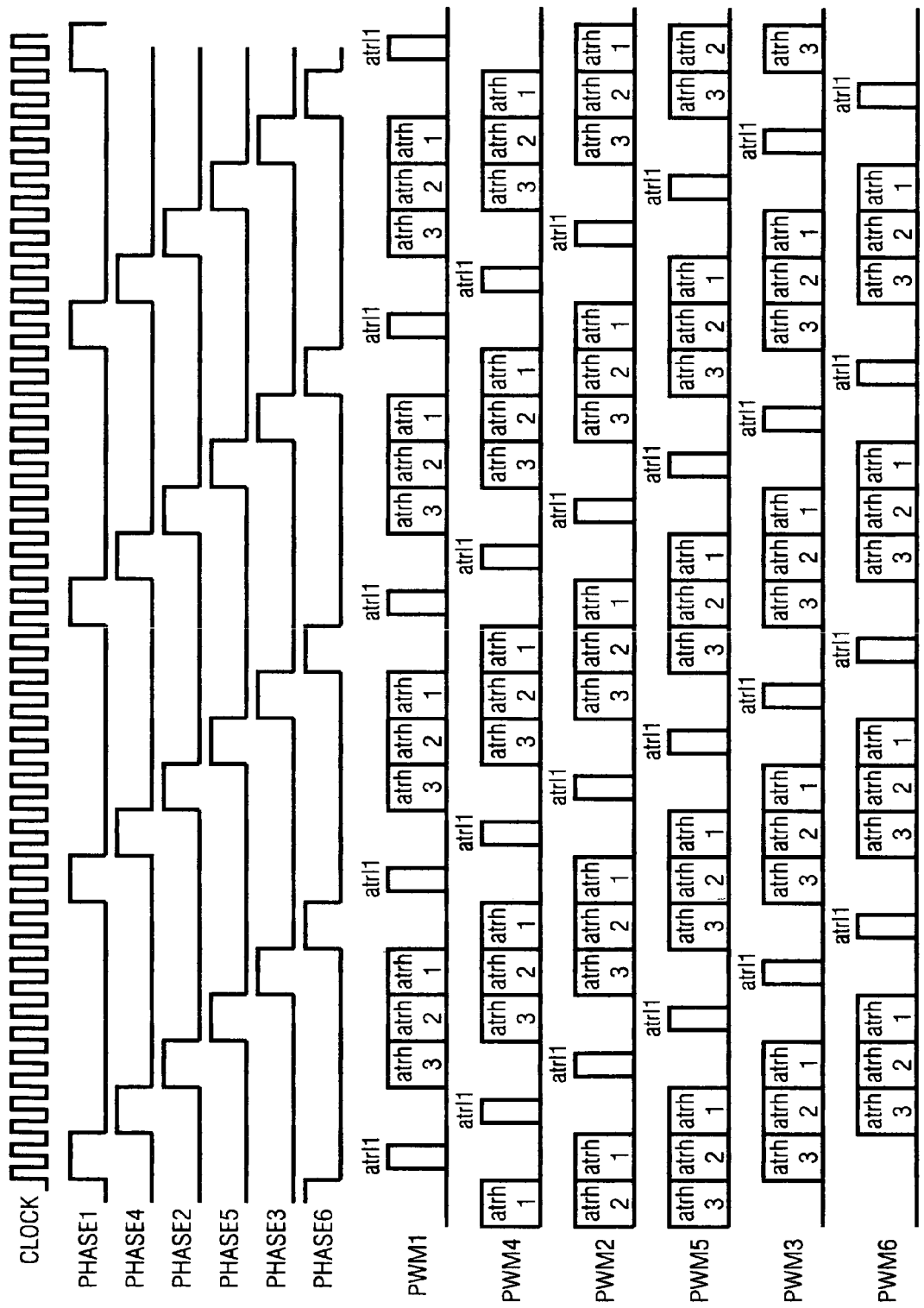
FIG. 10 is a series of pulse train diagrams illustrating the system timing for a system having six phases.

By way of example, see FIG. 10, where the system timing for a six phase system is shown. The various pulse trains: phase 1, phase2, phase 4, phase5, phase6, PWM1, PWM2, PWM3, PWM4, PWM5 and PWM6 are generated as in the prior example; however with the 6 phases, as shown. Thus, whenever more than 4 phases are provided with three threshold detectors, in case of an ATRH event that triggers all three thresholds, all ATRH pulses (atrh1, atrh2 and atrh3) are used. The ATRL events, being triggered by one threshold, remain the same regardless of the number of phases. In all cases, the ATRL and ATRH are mutually exclusive and cannot occur simultaneously. Also, as previously noted, in case of an ATRL event, the "normal" synchronous phase pulse is blocked, as well. By way of further detailed explanation see FIG. 11 showing a schedule of phase selection for any number of phases from 2 to 6. Thus, although the correction pulses provided in response to an ATRH event are asynchronously generated in different phases, the phases are selected in accordance with a predetermined scheduled timing relative to the normal synchronous pulse width modulated pulses.

What has then been described is a multi-phase pulse width modulated voltage regulator in which voltage excursions or deviations that exceed the load line voltage by more than a pre-determined amount are detected by an ATR circuit and a correction signal is applied. The correction signal is in the form of asynchronous pulses and the number of such pulses is a function of the magnitude of the voltage excursion as determined by the number of thresholds that are exceeded.

The present invention has been described above with reference to various exemplary embodiments. However, those skilled in the art will recognize that changes and modifications may be made to the exemplary embodiments without departing from the spirit and scope of the present invention. For example, the various components may be implemented in alternate ways, such as, for example, by providing other configurations of SPC's. By way of another example, the number of phases utilized is a matter of design choice. By way of a still further, the specific Pulse Width Modulator used to generate the PWM pulses is also a matter of design choice. Such changes or modifications are intended to be included within the spirit and scope of the present invention, as set forth in the following claims.

What is claimed is:

1. A method of detecting deviations from a target voltage level provided to a load, comprising:
   in a multiphase pulse-width modulated voltage regulator system providing synchronous pulse width modulated pulses for regulating voltage at the load, setting a threshold at which a deviation from the target voltage level in a first direction is detected;
   setting multiple thresholds at which deviations from the target voltage level in a second direction are detected;
   wherein each of the threshold setting steps comprises the step of applying a programmable signal to set each threshold at a desired level;
   providing a compensation signal by generating a plurality of correction pulses to adjust an output voltage, wherein said correction pulses are generated asynchronously; and
   selecting phases when said correction pulses are applied in accordance with a predetermined scheduled timing relative to the synchronous pulse width modulated pulses.

2. A method of detecting deviations from a target voltage level as in claim 1, wherein:
   the deviation in the first direction is a deviation in a positive direction; and
   the deviation in the second direction is a deviation in a negative direction.

3. A method of detecting deviations from a target voltage level as in claim 1, further comprising the step of:
   providing a compensation signal to adjust a voltage provided to the load.

4. A method of detecting deviations from a target voltage level as in claim 3 wherein the step of providing a compensation signal adjusts the output voltage to a new predetermined voltage that is a function of an output current.

5. A method of detecting deviations from a target voltage level as in claim 3, wherein the step of providing a compensation signal to adjust the output voltage comprises:
   providing a plurality of correction pulses.

6. A method of detecting deviations from a target voltage level as in claim 5, wherein the step of providing a plurality of correction pulses comprises:
   increasing the number of correction pulses that are provided when a deviation of more then one threshold is detected.

7. A method of detecting deviations from a target voltage level as in claim 1, wherein the step of setting multiple thresholds at which deviations from the desired voltage in a second direction are detected, comprises: setting exactly three thresholds.

8. A method of detecting deviations from a target voltage level as in claim 1, wherein the target voltage level is along a load line.

9. A method of detecting deviations from a target voltage level as in claim 1, further comprising the step of:
   providing a compensation signal to adjust an output voltage wherein the compensation signal blocks the synchronous pulse width modulated pulses.

10. A method of detecting deviations from a target voltage level as in claim 1, further comprises the steps of:

detecting when one or more of the multiple thresholds has been exceeded; and providing an output that is adjusted in accordance with the number of multiple thresholds that have been exceeded.

11. A method of detecting deviations from a target voltage level as in claim 10, in the step of providing an adjusted output comprises the steps of:

detecting a current at an output stage of the pulse-width modulated voltage regulator system;

providing the detected current to a filter; and adjusting the bandwidth of the filter when detecting that one or more of the multiple thresholds has been exceeded.

12. A method of detecting deviations from a target voltage level as in claim 11, comprises the additional steps of:

receiving pre-determined current values corresponding to the one or more of the multiple threshold values that have been exceeded;

adding such pre-determined current values to the detected current at an output stage; and providing the sum of the detected current and the pre-determined current values to the filter.

13. A method of detecting deviations from a target voltage level as in claim 10, the step of detecting when one or more of the multiple thresholds has been exceeded comprises:

sensing the voltage at the load; and determining when the change of voltage at the load exceeds a pre-determined threshold.

14. A multiphase power regulator, comprising:

a multiple pulse width modulator configured to provide synchronous pulse width modulated pulses;

an output stage comprising a high side FET, a low side FET and an inductor coupled to the multiphase pulse width modulator; and an active transient response circuit coupled between the output stage and the multiphase pulse width modulator, comprising:

a circuit for setting discrete voltage levels representing at least one first deviation from a target voltage in a first direction and multiple second deviations from the target voltage in a second direction, wherein the discrete voltage levels are set according to a programmable signal; and wherein the active transient response circuit is configured to:

detect a voltage level at the output stage;

provide a first compensation signal to the multiphase pulse width modulator to adjust the voltage level at the output stage that is a function of a first amplitude of deviation of the detected voltage level from a target voltage and provide a second compensation signal to the multiphase pulse width modulator that is a function of a second amplitude of deviation in the second direction, wherein the first compensation signal and second compensation signal comprise a plurality of correction pulses, wherein the correction pulses are generated asynchronously; and select phases when said correction pulses are applied in accordance with a predetermined scheduled timing relative to the synchronous pulse width modulated pulses.

15. A multiphase power regulators in claim 14 wherein said active transient response circuit comprises:

a plurality of comparators configured to provide an output when a sensed voltage exceeds the set discrete voltage.

16. A multiphase power regulator as in claim 15 wherein the plurality of comparators comprises:

three comparators to detect three discrete voltage levels representing deviations from the target voltage.

17. A multiphase power regulator as in claim 15, wherein the circuit for a setting discrete voltage levels comprises:

a digital to analog converter; and a voltage divider.

18. a multiphase power regulator as in claim 17, wherein said digital to analog converter is configured to receive a digital input signal representing a desired deviation from the target voltage and said voltage divider comprises: a plurality of series connected resistors.

19. A multiphase power regulator as in claim 18, wherein said digital to analog convener is configured to receive a programmable digital input signal representing a desired deviation from the target voltage.

20. A multiphase power regulator as in claim 14, wherein the target voltage is determined by adaptive voltage positioning (AVP).

21. A multiphase power regulator as in claim 14, further comprising: an adaptive voltage positioning circuit for setting the target voltage in accordance with a load line.

22. A multiphase power regulators as in claim 14, further comprising: a gating circuit having inputs connected to the output of said multiphase pulse width modulator anti said active transient response circuit for blocking synchronous pulse width modulated pulses on all phases.

23. A multiphase power regulator as in claim 14, wherein said pulse width modulator is configured to provide compensation pulses on at least on phase in addition to the synchronous phase output of the pulse width modulator.

24. A multiphase power regulator as in claim 23, wherein said active transient response circuit comprises: a circuit for setting discrete voltage levels representing deviations from the target voltage and a plurality of comparators configured to provide an output when a sensed voltage exceeds the set discrete voltage, further comprising:

a gating circuit having a first input for receiving said output asynchronously and a second input for receiving a phase signal, said gating circuit providing a gated output during said received phase signal.

25. A digital multiphase power regulator for supplying a load, comprising:

a digital controller configured to provide synchronous pulse width modulated pulses to multiple phases;

a first high side field effect transistor and a first low side field effect transistor connected at a common point therebetween, forming a series connection between a first potential source and a second potential source;

a first node at said common point between said first high side field effect transistor and said first low side effect transistor connected to one end of a first inductor, the other end of said first inductor coupled to a common connection of a capacitor and the load;

a second high side field effect transistor and a second low side field effect transistor connected at a common point therebetween, forming a series connection between said first potential source and said second potential source;

a second node at said common point between said second high side field effect transistor and said second low side field effect transistor connected to one end of a second inductor, the other end of said second inductor connected to said common connection of said capacitor and load; and an active transient response circuit, comprising:

a circuit for setting discrete voltage levels representing at least one first deviation from a target voltage in a first direction and multiple second deviations from the target voltage in a second direction, wherein the discrete voltage levels are set according to a programmable signal; and wherein the active transient response circuit is configured to:

detect deviations from a pre-determined voltage level coupled between said common connection of said capacitor and load and said pulse width modulator;

provide a compensation signal by generating a plurality of correction pulses, wherein said correction pulses are generated asynchronously; and select phases when said correction pulses are applied in accordance with a predetermined scheduled timing relative to the synchronous pulse width modulated pulses.

26. A multiphase power regulator as in claim 25, further comprising; an adaptive voltage positioning (AVP) circuit for determining the target voltage.

27. A multiphase power regulator as in claim 26, wherein the adaptive voltage positioning circuit comprises:

a first circuit for receiving a signal indicative of an active transient response (ATR) event;

a second circuit for sensing the current at the output stage; and a filter circuit coupled to the output of the first and second circuits, the bandwidth of the filter circuit being changed in response to a signal from the first circuit when the signal indicative of the ATR even is received.

28. A multiphase power regulator as in claim 27, wherein the adaptive voltage regulator further comprises:

an output circuit for receiving the output of the filter circuit and a set point value to provide a digital output value that is the target voltage.

29. A multiphase power regulator as in claim 28, wherein the adaptive voltage post honing circuit further comprises:

a pre-positioning circuit for receiving predetermined current values for different levels of active transient response high (ATRH) events and providing such predetermined current values to the filter circuit when an active transient response high (ATRH) event is detected.

30. A multiphase power regulator comprising:

a multiphase pulse width modulator configured to provide synchronous pulse width modulated pulses;

an output stage comprising a high side FET, a low side FET and an inductor coupled to the multiphase pulse width modulator;

an active transient response circuit coupled between the output stage and the multiphase pulse width modulator comprising:

a circuit for setting discrete voltage levels representing at least one first deviation from a target voltage in a first direction and multiple second deviations from the target voltage in a second direction, wherein the discrete voltage levels are set according to a programmable signal; and wherein the active transient response circuit is configured to:

detect the voltage level at the output stage;

provide a compensation signal to the multiphase pulse width modulator that is a function of a deviation of the detected voltage level from the target voltage, wherein the compensation signal comprises at least one asynchronously generated correction pulse; and select phases when said at least one correction pulse is applied in accordance with a predetermined scheduled timing relative to the synchronous pulse width modulated pulses; and an adaptive voltage positioning (AVP) circuit for determining the target voltage;

wherein the adaptive voltage positioning (AVP) circuit comprises:

a first circuit for receiving a signal indicative of an active transient response (ATR) event;

a second circuit for sensing the current at the output stage; and a filter circuit coupled to the output of the first and second circuits, the bandwidth of the filter circuit being changed in response to a signal from the first circuit when a signal indicative of an active transient response (ATR) event is received.

31. A multiphase power regulator as in claim 30, wherein the adaptive voltage regulator hither comprises:

an output circuit for receiving the output of the filter circuit and a set point value to provide a digital output value that is the target voltage.

32. A multiphase power regulator as in claim 31, wherein the adaptive voltage positioning circuit further comprises:

a pre-positioning circuit for receiving predetermined current values for different levels of active transient response high (ATRH) events and providing such predetermined current values to the filter circuit when an active transient response high (ATRH) event is detected.

* * * * *

UNITED STATES PATENT AND TRADEMARK OFFICE
CERTIFICATE OF CORRECTION

PATENT NO. : 7,570,036 B2
APPLICATION NO. : 10/938031
DATED : August 4, 2009
INVENTOR(S) : Tang et al.

Page 1 of 1

It is certified that error appears in the above-identified patent and that said Letters Patent is hereby corrected as shown below:

On the Title page of the patent, Item [75] the spelling of the first named inventor should be corrected to Benjamim Tang;

In column 16, claim 22, line 22, delete "regulators" and insert --regulator--;

In column 18, claim 31, line 37, delete "hither" and insert --further--.

Signed and Sealed this

Twentieth Day of October, 2009

David J. Kappos
*Director of the United States Patent and Trademark Office*